May 5, 1953 W. L. HOUSTON, JR., ET AL 2,637,333
EMERGENCY VALVE
Filed Sept. 9, 1948

INVENTORS
W. L. HOUSTON, JR.
M. F. RAWLINGS
BY Hudson & Young
ATTORNEYS

Patented May 5, 1953

2,637,333

UNITED STATES PATENT OFFICE 2,637,333

EMERGENCY VALVE

William L. Houston, Jr., and Marshall F. Rawlings, Phillips, Tex., assignors to Phillips Petroleum Company, a corporation of Delaware Application September 9, 1948, Serial No. 48,394

5 Claims. (Cl. 137—68)

This invention relates to emergency valves. In one specific aspect, it relates to emergency valves which open at a predetermined temperature. In another specific aspect, it relates to emergency valves which are protected during long periods of non-use from corrosion or other factors tending to cause them to stick, so that they will be sure to open when the emergency comes.

In many industries it is necessary to provide emergency valves so that certain portions of the plant or apparatus employed may be flooded or drained, as the case may be, in order to meet the emergency. For example, if a tank contains inflammable liquid it is often advisable to provide an emergency valve which opens at a predetermined temperature and allows the inflammable liquid to flow through an emergency conduit to a point where it may be better controlled or safely disposed of. Oftentimes, it is desirable to inject a non-inflammable liquid or gas like carbon dioxide through an emergency valve in order to blanket the inflammable liquid. Other applications occur where a fire extinguishing fluid is to be admitted through an emergency valve, or where fluid of any type is to be admitted through an emergency valve which has been closed for a long time. By fluid, we include liquids, gases and other fluids such as sand.

One of the greatest hazards relating to emergency valves is that they may not be called upon to operate for a period of several years, and then when the emergency finally occurs the valve will not operate because it has become stuck due to corrosion or deposits of some sort, often due to the fluid which is normally contacting the closed valve. The valve of the present invention is designed to open without difficulty no matter how long the time may be between emergencies.

One object of this invention is to provide an emergency valve.

Another object is to provide an emergency valve which will positively open at a predetermined temperature.

Another object is to provide an emergency valve which is not contacted by the fluid until the valve opens upon the occurrence of the emergency, whereby sticking of the valve is obviated.

Further objects are to provide an emergency valve which is simple, inexpensive, foolproof, strong in construction, easily serviced and which above all will positively open in an emergency without failure due to corrosion or solids deposited from the fluid being controlled.

Numerous other objects and advantages will be apparent to those skilled in the art upon reading the accompanying specification, claims and drawings.

Figures 1, 2:
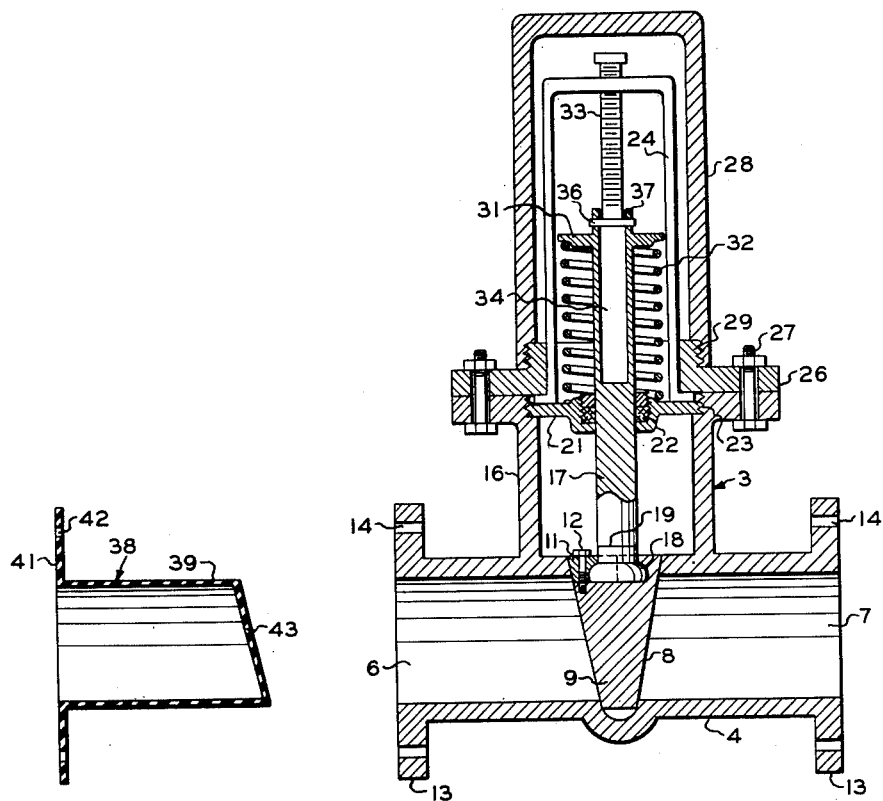
Figure 1 is an elevational view in cross section of a valve embodying the present invention.
Figure 2 is an elevational view in cross section of a frangible cup-shaped gasket which may be inserted in the adjacent passage of Figure 1 when desired.

In Figure 1 an emergency valve generally designated as 3 is preferably formed with a valve body 4 having an inlet passage 6 and an outlet passage 7 connected to each other through a valve seat 8. In valve body 4 a valve 9 is mounted for reciprocation and is preferably a gate valve as shown. Valve 9 may be made in two parts 9 and 11 secured together by suitable means such as bolt 12.

Body 4 is provided with suitable means for connecting the same in a fluid conduit such as connected flange 13 provided with holes 14. Obviously screw thread connections or the like, or other connecting means common to pipes may be employed.

In order to move valve 9 in the valve body 4 the valve 3 is provided with a housing 16. The valve 9 has a valve stem 17 secured thereto by head 18 which is preferably made separatable at 19 from stem 17. Stem 17 is guided by sealing means 21 which may be provided with a usual stuffing box 22 or other common sealing means and which is preferably secured to housing 16 by threads 23.

Annular sealing flange 21 is held down by threads 23. Resting on top of flange 21 is an inverted U-shaped yoke member 24 which is held in place by flange 26 which may be secured to 16 by suitable fastening means such as nuts and bolts 27. Flange 26 may be provided with a suitable cover 28 secured thereto by threads 29.

Valve stem 17 is provided with a shoulder 31 and a helical spring 32 is placed in compression between shoulder 31 and sealing flange 21, which spring biases the valve 9 to open the conduit 6, 7. However, the valve is normally prevented from opening by a stop member 33, which preferably is screw threaded through yoke 24 in telescopic relationship with stem 17. Stem 17 is provided with a hollow central portion 34 for receiving stop member 33.

A link member 36 is preferably provided in the form of a pin which is fusible at a predetermined temperature and which is secured to said stop member 33 and to said valve stem 17 to maintain said valve closed on said seat until it fuses. As shown, it is preferred to provide a pair of holes 37 through the walls of valve stem 17 and insert link member 36 in the form of a cylindrical pin. Screw 33 can then be adjusted to hold valve 9 firmly against its seat 8.

In order to prevent fluid in inlet conduit 6 from contacting valve 9 and seat 8 during the long periods that generally occur before the emergency valve goes into use, it is desirable to provide supplemental sealing means generally designated as 38 and shown in Figure 2.

Sealing means 38 preferably comprises a cup-shaped gasket 39 made of a suitable material such as hard rubber. When designed for co-operation with flanges 13 and holes 14 it is provided with similar flanges 41 and holes 42. Obviously flange 41 is modified when screw connections are used in place of flange 13, it being desirable to seal 38 off at that point to afford the best protection of valve 9 as possible. However, as wall 39 closely contacts wall 6 this will provide suitable sealing in many instances. Cup-shaped gasket 39 is provided with a bottom 43 which is formed to correspond with the shape and position of valve 9 when the valve is closed.

Gasket 38 may be made of other materials besides hard rubber, such as a soft rubber or resin. Any material is suitable, such as beeswax, provided it is insoluble in the fluid which is being retained by the valve and provided it is sufficiently strong in compression when supported by valve 9 to be unbreakable at the fluid pressures encountered but still is frangible in tension when valve 9 is removed from seat 8 so that a predetermined fluid pressure will rupture end 43. For the purpose of emergency use it is immaterial whether end 43 breaks into small pieces, or becomes elongated under fluid pressure and then rips or tears, as long as it becomes ruptured by the fluid pressure.

Operation

The operation of the device shown in Figure 1 is quite simple. Pin 36 was made of a fusible material which melts at a predetermined temperature. When pin 36 reaches that temperature, which may be caused by a fire in the vicinity, pin 36 fuses. Spring 32 then moves shoulder 31 up, telescoping stem 17 and screw 33 so that 33 extends down into 34, withdrawing valve 9 from seat 8. Fluid may then pass from passage 6 to passage 7, the flow naturally being in the direction of decreased pressure.

When it is desired to close the valve and reset the same, cover 28 may be removed and shoulder 31 depressed with a tool, or by pushing with the operator's foot, until a new pin 36 may be shoved through hole 37. Some adjustment of screw 33 may be necessary, and if so it may be done with a wrench.

The operation of the device when cup shaped gasket 38 of Figure 2 is employed is very similar. These cup shaped gaskets can be inserted in either passage 6 or passage 7, or in both passages. In either instance the fluid under predetermined pressure is pressing against the inside of gasket 38 but is unable to rupture the same, because gasket 38 is strong under compression when backed up by contact with the walls of 6 and contact with valve 9. When valve 9 is moved to open position, however, then the end 43 of gasket 38 is unsupported. Gasket 38 is made of a material which is unable to remain unsupported when subjected to fluid pressure and said predetermined fluid pressure breaks end 43 and flow immediately occurs through passages 6 and 7.

Gasket 38 becomes very important in the operation of the valve in Figure 1 when the fluid is corrosive, or contains fine solid particles which may be deposited. A period of several years may go by with gasket 38 protecting valve 9 from the fluid before the day occurs upon which the emergency arises for which valve 9 was designed.

It is often found to the sorrow of those concerned that emergency valves which have not operated for several years will not operate due to corrosion or the like at the very moment when the emergency occurs for which they were created and for which they were installed. It is worse than having no emergency valve and no emergency conduit at all than to have an emergency valve and emergency conduit which will not operate when the emergency occurs. This is because fire fighting plans, or other emergency plans, may be based on the operation of the emergency valve.

As a specific example of a predetermined temperature at which it is desirable to have such a valve open, in the case of a storage tank containing butane, it would be desirable to have the valve open at a temperature such as 150° F. or 500° F., before the vessel or equipment is subjected to excessive temperatures and pressures. Pressure relief valves on such tanks are not sufficient in many instances when the steel wall of the tank (not shown) is weakened by being heated to a point where the tensile strength of the steel wall is insufficient to contain a fluid having pressure as great as the pressure necessary to open the pressure relief valves (not shown).

It is believed that the above specification discloses an emergency valve which will positively operate in an emergency even after years of non-use and that the present invention will carry out the objects set forth above.

While we have illustrated in the drawings and discussed in the specification a preferred illustrative embodiment of our invention, obviously our invention is not limited strictly thereto but instead is defined in the following claims.

Having described our invention, we claim:

1. An emergency valve comprising in combination a valve body having an inlet and outlet passage and a valve seat connecting said inlet and outlet passages, a valve mounted to move in said body to and from said seat and to seat directly in contact with said seat and thereby control fluid flow through said inlet and outlet passages, means mounted on said body biasing said valve away from said seat, means mounted on said body providing a force holding said valve closed on said seat, said last means including a portion fusible at a predetermined temperature to yield whereby said biasing means moves said valve off said seat, and supplemental sealing means sealing off said inlet passage from said valve and disposed in said inlet passage comprising a cup shaped member in contact with said valve and the walls of said inlet passage when said valve is closed on said seat but not extending between said valve and said seat, said sealing means being frangible at a predetermined pressure in said inlet passage when placed in tension by the movement of said valve off said seat, but being protected from the force holding said valve against said seat.

2. An emergency valve comprising in combination a valve body having an inlet and outlet passage and a valve seat connecting said inlet and outlet passages, a valve mounted to move in said body to and from said seat and to seat directly in contact with said seat and thereby control fluid flow through said inlet and outlet passages, and supplemental sealing means sealing off said inlet passage from said valve and disposed in said inlet passage comprising a cup shaped member in contact with said valve and the walls of said inlet passage when said valve is closed on said seat but not extending between said valve and said seat, said sealing means being frangible at a predetermined pressure in said inlet passage when placed in tension by the movement of said valve off said seat.

3. An emergency valve for a fluid comprising a valve body provided with a conduit, said body having a valve seat disposed in said conduit, a gate valve mounted to reciprocate in said valve body and to seat directly on and in contact with said seat and close said conduit in one position, a valve stem secured to said valve, sealing means mounted on said body guiding said valve stem, a shoulder on said valve stem, a spring between said sealing means and said shoulder biasing said valve to open said conduit, a stop member mounted on said valve body in telescopic relationship with said stem, a link member fusible at a predetermined temperature secured to said stop member and to said valve stem to maintain said valve held by force on said seat until said link member fuses, and supplemental sealing means comprising a cup shaped gasket having a portion sealing against the walls of said conduit sealing off the inlet portion of said conduit from said valve seat and gate valve but not extending between said valve and said seat to prevent contact of said fluid with said valve and said seat until said valve opens, said supplemental sealing means being frangible under a predetermined pressure of said fluid when said valve is open whereby said valve can open without sticking after long non-use, but being protected from the force holding said valve against said seat.

4. An emergency valve for a fluid comprising a valve body provided with a conduit having terminal flanges for connection to flanged pipe, said body having a valve seat disposed in said conduit, a gate valve mounted to reciprocate in said valve body and to seat directly on and in contact with said seat and close said conduit in one position, a valve stem secured to said valve, a shoulder on said valve stem, a spring between said sealing means and said shoulder biasing said valve to open said conduit, a stop member mounted on said valve body in telescopic relationship with said stem, a link member fusible at a predetermined temperature secured to said stop member and to said valve stem to maintain said valve held by force on said seat until said link member fuses, and supplemental sealing means comprising a cup shaped member having a radial flange adapted to be disposed in sealing contact with the terminal flange of the inlet portion of said conduit, having a portion resting against said gate valve and having a portion sealing against the walls of said conduit sealing off the inlet portion of said conduit from said valve seat and gate valve but not extending between said valve and said seat to prevent contact of said fluid with said valve and said seat until said valve opens, said supplemental sealing means being frangible under a predetermined pressure of said fluid when said valve is open whereby said valve can open without sticking after long non-use, but being protected from the force holding said valve against said seat.

5. The combination of claim 3 in which the stop member comprises two telescopically adjustable members whereby the force holding said valve on said seat may be adjusted.

WILLIAM L. HOUSTON, Jr.
MARSHALL F. RAWLINGS.

References Cited in the file of this patent

UNITED STATES PATENTS

| Number | Name | Date |
|---|---|---|
| 423,608 | Johnson | Mar. 18, 1890 |
| 842,393 | DeFerranti | Jan. 29, 1907 |
| 1,076,647 | Welman | Oct. 21, 1913 |
| 1,834,645 | Ryan | Dec. 1, 1931 |
| 1,886,454 | Sutherland | Nov. 8, 1932 |
| 1,924,417 | Ryan | Aug. 29, 1933 |
| 2,079,164 | Glab | May 4, 1937 |
| 2,115,371 | Mossberg | Apr. 26, 1938 |